(12) United States Patent
Schiffman et al.

(10) Patent No.: US 9,471,799 B2
(45) Date of Patent: Oct. 18, 2016

(54) METHOD FOR PRIVILEGED MODE BASED SECURE INPUT MECHANISM

(71) Applicant: Advanced Micro Devices, Inc., Sunnyvale, CA (US)

(72) Inventors: Joshua S. Schiffman, Austin, TX (US); David A. Kaplan, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 74 days.

(21) Appl. No.: 14/492,786

(22) Filed: Sep. 22, 2014

(65) Prior Publication Data

US 2016/0085976 A1 Mar. 24, 2016

(51) Int. Cl.
  *G06F 21/62* (2013.01)
  *G06F 21/60* (2013.01)

(52) U.S. Cl.
  CPC ............. *G06F 21/62* (2013.01); *G06F 21/606* (2013.01)

(58) Field of Classification Search
  CPC .......... G06F 21/31; G06F 2221/2151; G06F 2221/2103; G06F 21/62; G06F 21/606; H04L 63/083; H04L 63/0823; H04L 67/02; H04L 63/08; H04L 63/10; H04L 63/168; H04L 2463/102; G06Q 20/108; G06Q 20/12; G06Q 20/40; G06Q 20/3821
  See application file for complete search history.

(56) References Cited

U.S. PATENT DOCUMENTS

| | | | |
|---|---|---|---|
| 4,333,090 A | 6/1982 | Hirsch | |
| 4,479,112 A | 10/1984 | Hirsch | |
| 7,835,521 B1 | 11/2010 | Pinheiro | |
| 8,020,215 B2 | 9/2011 | Nam | |
| 8,340,290 B2 | 12/2012 | Kang | |
| 2003/0159053 A1 | 8/2003 | Fauble et al. | |
| 2006/0195907 A1* | 8/2006 | Delfs | G06F 21/74 726/26 |
| 2009/0119221 A1* | 5/2009 | Weston | G06Q 20/382 705/76 |
| 2012/0272059 A1 | 10/2012 | Shetty | |
| 2013/0007466 A1 | 1/2013 | Saranghar | |
| 2013/0073849 A1 | 3/2013 | Wang | |
| 2013/0145475 A1* | 6/2013 | Ryu | G06F 21/31 726/26 |
| 2013/0266141 A1* | 10/2013 | Kim | H04W 12/02 380/270 |
| 2014/0181529 A1* | 6/2014 | Joyce, III | G06F 21/31 713/183 |

OTHER PUBLICATIONS

Written Opinion and Search Report in application No. PCT/US2015/051346 issued Jan. 8, 2016.

* cited by examiner

*Primary Examiner* — Don Zhao
(74) *Attorney, Agent, or Firm* — Meyertons, Hood, Kivlin, Kowert & Goetzel, P.C.

(57) ABSTRACT

A system and method are disclosed for securely receiving data from an input device coupled to a computing system. The system includes an interface configured to receive data from an input device, a coprocessor, and a host computer, wherein the host computer includes an input handler and a host processor. The host processor is configured to execute code in a normal mode and in a privileged mode. The host processor switches from the normal mode to the secure mode upon data being available from the interface while the host computer is in a secure input mode. The input handler receives the data from the interface and sends the received data to the coprocessor responsive to receiving the data while operating in the secure mode.

20 Claims, 5 Drawing Sheets

METHOD FOR PRIVILEGED MODE BASED SECURE INPUT MECHANISM

BACKGROUND

1. Technical Field

This invention is related to the field of computing systems and more specifically to the implementation of secure input through a keyboard.

2. Description of Related Art

Computing systems such as, personal computers (PC), laptop computers, and mobile devices (e.g. smartphones and tablets) are widely used for a variety of daily tasks. Many tasks rely on a user entering a password or other form of secure code word to perform the task in order to confirm the identity of the user. "Identity thieves" (i.e., other people attempting to impersonate the user, often with malicious intent) may attempt to obtain a user's password by installing a software program onto the user's computer which may log key stokes from the user's keyboard and send the information to the identity thief through the internet or other communication channel. These software programs for logging user input may also be called "keyloggers" and are a form of malicious software (also referred to herein as "malware"). One way identity thieves may place a keylogger onto a user's computer is to hide the malware in an otherwise innocuous appearing software application that the user may install.

Once a keylogger is installed on a computer, every keystroke may be captured and sent to an identity thief. Anti-virus software installed on the computer may be capable of discovering the keylogger and removing it. In order to discover the keylogger, however, the anti-virus software must be able to recognize it. Therefore, anti-virus programs may be better at discovering known keyloggers that have been in use for some amount of time. A keylogger that has not been released by identity thieves may be immune to the anti-virus software for at least some period of time before a user discovers it and the anti-virus programmers can add the detection information to their anti-virus programs. During this period of time when the keylogger may be undetectable, any user with the keylogger unknowingly installed may be susceptible to having their information, in particular, their passwords, stolen, putting their sensitive information at risk.

Various techniques have been developed to thwart such key logging attempts. One such method is to employ a secure keyboard. A secure keyboard is a piece of hardware to replace a default keyboard that may be commonly used. The secure keyboard may encrypt the data sent from the keyboard to the computer and decrypt the data only after the data has passed the point that a keylogger may be able to read the data. In such a system, the keylogger may receive what may seem as incoherent gibberish that may be of no use to the identity thief receiving the logged data. Secure keyboards, however, may be costly and may not be available with features desirable to a given user.

A method is desired in which key logging software may be prevented from accessing data sent from an unsecure keyboard. Systems and methods for securely transferring data from a keyboard to a host processor in a computing system are presented herein.

SUMMARY OF EMBODIMENTS

Various embodiments of a computing system are disclosed. Broadly speaking, a system and methods are contemplated in which the system may include an interface configured to receive data from an input device and assert a signal when data has been received. The system may also include a coprocessor, and a host computer, wherein the host computer includes a host processor and an input handler. The input handler may be configured to receive first data from the interface responsive to a first signal from the interface, while the host processor is operating in a normal operating mode, and store the received first data in one or more memory locations. The host computer may activate a secure input mode responsive to a user request. The host processor may enter a privileged operating mode from the normal operating mode responsive to an assertion of a second signal from the interface. The input handler may then receive second data from the interface in response to the host processor entering the privileged operating mode. The input handler may generate a code word corresponding to the received second data and send the received second data and the code word to the coprocessor. The coprocessor may verify that the received second data corresponds to the code word.

In one embodiment, the coprocessor may be configured to create a session key word and share the session key word with the input handler. In another embodiment, the host processor may be further configured to enter the privileged operating mode in response to an assertion of an interrupt, wherein the assertion of the interrupt may be in response to the second signal from the interface. In a further embodiment, the interrupt may have a higher priority than other interrupts of the host processor.

In a given embodiment, to send the received data from the input device and the code word to the coprocessor, the input handler may be further configured to encrypt the received data using the session key word. In a another embodiment, the input handler may be configured to store the verified data in one or more memory locations in response to a determination the coprocessor verified the received second data corresponds to the code word. The input handler may also replace the received second data with a preselected value. In a further embodiment, the host processor may be further configured to return to the normal operating mode in response to the input handler storing the verified data.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

A computer system may be susceptible to malicious key-logging software (commonly referred to as a "keylogger") that may attempt to detect sensitive information entered on a keyboard or other form of Human Interface Device (HID) and forward this information to individuals intending to misuse the information, i.e., "hackers" or "identity thieves." The keylogger may be unknowingly installed within the computer system and may be undetectable by anti-virus software also installed in the computer system. Systems and methods are presented herein that may protect data input on an HID from a keylogger installed in the system.

Figure 1:
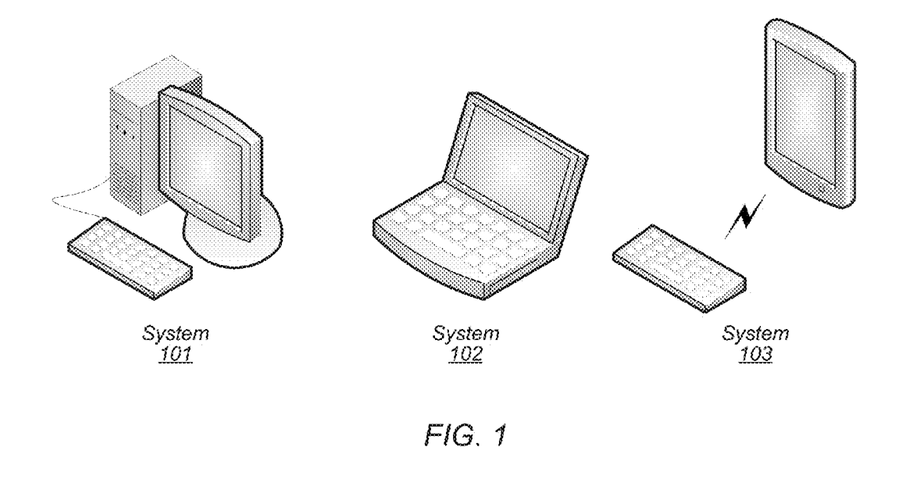
FIG. 1 is an illustration of various embodiments of a computing system.

Several embodiments of computing systems are illustrated in FIG. 1. System 101 may represent a desktop computer, system 102 may represent a laptop computer, and system 103 may represent a tablet or smartphone with a wireless keyboard. Any of these computing systems may be susceptible to a keylogger.

System 101 may include one or HIDs, such as a keyboard, a mouse, a microphone, a camera, etc. Any such device may be capable of receiving input from a user and using the data to perform or initiate sensitive transactions. Sensitive transactions may include entering passwords, performing gestures that may be used to access personal or corporate data that a user would not want to be made public, and the like.

Systems 102 and system 103 may include similar HIDs to system 101 and therefore be susceptible to keylogger attacks through one or more of these HIDs. Other devices not illustrated, such as smart televisions or video game consoles may also be vulnerable to keyloggers or similar types of malware. Any computing system in which software may be installed, that handles sensitive data entered through an HID, and that has a communications channel viewable by a third party may be a target of an identity thief.

It is noted that the computer systems illustrated in FIG. 1 are merely an example. Other types of computer systems with HIDs are possible and contemplated.

Figure 2:
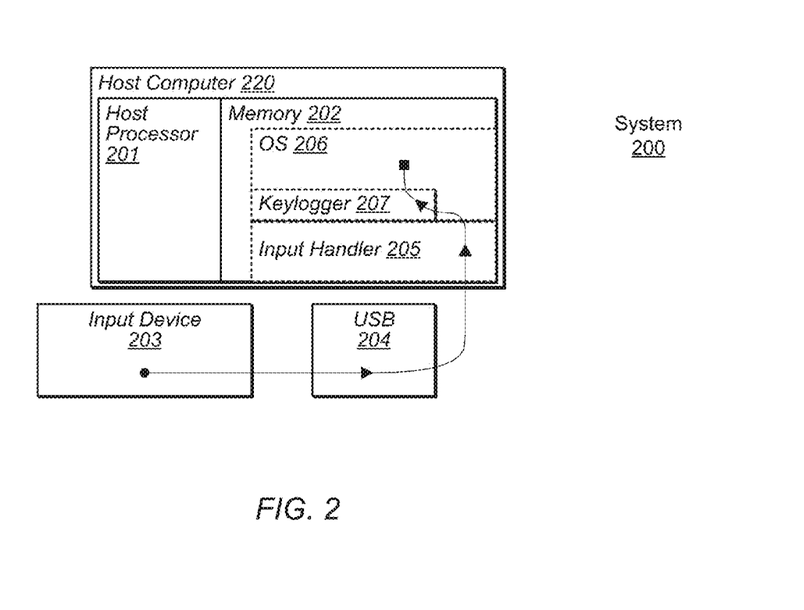
FIG. 2 is a block diagram illustrating an embodiment of a computing system.

Turning to FIG. 2, a block diagram of a computer system is illustrated. System 200 includes host computer 220, which includes host processor 201, coupled to memory 202. Host computer 220 is coupled to input device 203 via Universal Serial Bus (USB) 204. Host processor 201 may execute code from input handler 205 and Operating System (OS) 206. Host processor 201 may also execute code from keylogger 207 unbeknownst to a user of system 200.

Host computer 220 may be a computing block within system 200 consisting of host processor 201 and memory 202. In some embodiments, host computer may be implemented as a motherboard within system 200. Other embodiments are contemplated such as, for example, host computer 220 corresponding to a System-on-a-Chip (SoC) in which functions of both host processor 201 and memory 202 are included on a single die or host computer 220 corresponding to a System-in-a-Package (SiP) in which host processor 201 and memory 202 are implemented as separate dies included in a single package. Host computer may be capable of storing and running code instructions for software applications such as input handler 205, operating system 206 and keylogger 207.

Host processor 201 may, in some embodiments, be implemented as a general-purpose processor that performs computational operations responsive to the execution of instructions associated with application software. In other embodiments, host processor 201 may be a central processing unit (CPU) such as a microprocessor or a microcontroller and may include multiple CPU cores. In various embodiments, host processor 201 may implement any suitable instruction set architecture (ISA), such as, e.g., x86, ARM™, MIPS, or PowerPC™ ISAs.

Host processor 201 may include multiple modes of operation, including a normal mode and a secure mode (also referred to herein as a "privileged mode"). Some or all of code instructions for OS 206 may be executed only in the normal mode of operation, while code instructions for input handler 205 may be executed in both the normal mode and the secure mode. Since operating systems such as OS 206 may manage the operation of other applications, other applications launched through OS 206 may also be relegated to operation in normal mode only. In various embodiments, the secure mode of operation may be entered through a power-up boot sequence or a specific type of secure interrupt. The secure interrupt may be the highest priority interrupt within host processor 201. As the highest priority interrupt, code executing in the secure mode may not be interrupted by another application running in host computer 220, such as code for OS 206 or keylogger 207. The secure mode may, in some embodiments, correspond to the System Management Mode (SMM) used in the x86 architecture or the TrustZone Secure Mode used in the ARM architecture. By restricting the operation of OS 206 to the normal mode, code instructions of keylogger 207 may be prevented from executing in the secure mode, since keylogger 207 may not launch until OS 206 is active. The secure mode may have additional hardware restrictions, such as, for example, a restricted memory access range or peripherals only accessible in the secure mode.

Memory 202 may include one or more types of memory. For example, in various embodiments, memory 202 may include Dynamic Random Access Memory (DRAM), Static Random Access Memory (SRAM), Read-Only Memory (ROM), NAND Flash memory, NOR flash memory, Ferroelectric Random Access Memory (FeRAM), or any other suitable data storage medium. Memory 202 may include one or more cache memories from which host processor 201 may execute code instructions.

Input device 203 may be a keyboard or other type of HID in which a user enters data. Other examples of a suitable HID may include a mouse, a trackpad (also referred to as a "touchpad"), a microphone, a joystick, a webcam, or a trackball. In some embodiments, the input device may be a combination of more than one HID. Input device 203 may be a separate physical device attached to USB 204 through a cord connected to a USB port or a separate wireless device with a receiver attached to USB 204 through a USB port. In other embodiments, input device 203 may be a part of the same physical device (e.g., a keyboard of a laptop) attached to USB 204 through an internal USB channel. Input device 203 may output digital values using a supported USB protocol in response to input from a user, such as, for example, a key press on a keyboard or movement of a mouse. In these examples, the key press may result in a corresponding value, such as an American Standard Code for Information Interchange (ASCII) value, to be sent to USB 204. In the case of a mouse, values corresponding to changes in horizontal and vertical directions may be calculated by the device and sent to USB 204, as well as values corresponding to various button presses.

USB 204 may be the interface from input device 203 to host processor 201. USB 204 may implement any suitable standard of USB protocol, such as USB 1.1, USB 2.0, or USB 3.0. USB 204 may be a dedicated USB host controller. In other embodiments, may be configurable as either a USB device or host such as allowed by the USB On-The-Go (OTG) protocol used by some mobile devices. USB 204 may be incorporated as a functional block on a same chip (also referred to herein as a "die") as host processor 201, or may be a separate die in a separate package on a same circuit board as host processor 201. In other embodiments, USB 204 may be on a separate circuit board from host 201 and electrically coupled to host processor 201.

USB 204 may use the implemented USB protocol to monitor input device 203 for input activity. In response to the activity, USB 204 may receive any values sent by input device 203 and signal host processor 201 that input has been received and is ready to be forwarded to host processor 201. Within host processor 201, the signal from USB 204 may be polled to determine if it has been asserted or may be connected to an interrupt, such that a change in state of the signal causes an internal interrupt in host processor 201.

Code or program instructions for input handler 205 may reside in memory 202. In some embodiments, code instructions for input handler 205 may permanently reside in memory 202 if memory 202 includes non-volatile memory such as, e.g., flash memory or ROM. In alternate embodiments, code instructions for input handler 205 may reside in a separate memory for long-term storage and be copied into memory 202 during a system boot process. Input handler 205 may correspond to a device driver (i.e., program instructions for interfacing directly with hardware in system 200) and may monitor USB 204 for activity on input device 203. In some embodiments, the monitoring may be by polling one or more signals from USB 204 or in other embodiments, the monitoring may include enabling an interrupt on one or more signals from USB 204. Upon detecting input from USB 204, input handler 205 may receive data values from USB 204 and store these values in an input buffer, which may correspond to locations in memory 202 reserved for storing user input from input device 203. In other embodiments, USB 204 may store the data values into an input buffer in memory 202 through use of a Direct Memory Access module (not shown). Input handler 205 may then signal OS 206 or another application active in host processor 201 that data from input device 203 has been received and may be accessed from the input buffer.

OS 206 may include code or program instructions executed by host processor 201 from memory 202. OS 206 may provide an interface between active applications and the hardware of system 200. OS 206 may also provide an interface on system 200 for a user to activate (or "launch") various programs. In some embodiments, active applications may have access to a hardware driver (code instructions for operating a specific piece of hardware in system 200), while in other embodiments, applications may be limited to accessing hardware through OS 206.

Keylogger 207 may consist of code instructions placed in memory 202 unintentionally by a user. Keylogger 207 may be a form of malicious software that is placed into memory 202 by an application advertised as performing a legitimate function and therefore may intentionally be installed by the user. A program hiding malware in an otherwise useful application is also known as a Trojan horse. If anti-virus software is active on host processor 201, keylogger 207 may not be detectable if keylogger 207 has not been previously discovered by the providers of the anti-virus software or if keylogger 207 has not been active within system 200 long enough for anti-virus software to notice suspicious activity that may be associated with key logging malware.

Keylogger 207 may monitor OS 206 or input handler 205 to detect when input is received and may attempt to read the input buffer when input handler 205 signals OS 206 that new input has been received. Keylogger 207 may read the input buffer and save the read data to another location for temporary or long-term storage. In some embodiments, keylogger 207 may send the stored data periodically to a predetermined location via an internet connection or other communication channel. In other embodiments, keylogger 207 may send the read data once a set amount of data has been collected. The receiver of the data, a potential identity thief, may use the data to determine sensitive information, such as usernames and passwords that the user may have entered during usage of system 200.

It is noted that input handler 205, OS 206 and keylogger 207 may consist of a collection of code instructions (i.e., a program, application, or driver) to be executed by host processor 201. As such, herein the disclosure, when input handler 205, OS 206 or keylogger 207 are described as performing a task, it is understood that host processor 201 is performing the said task as caused by execution of the corresponding code instructions.

The system depicted in FIG. 2 is merely an example for demonstrative purposes, and, as such, only features for demonstrating concepts are disclosed herein. Other embodiments may include other functional blocks associated with computing systems, such as, for example, displays, audio peripherals and communication peripherals.

Figure 3:
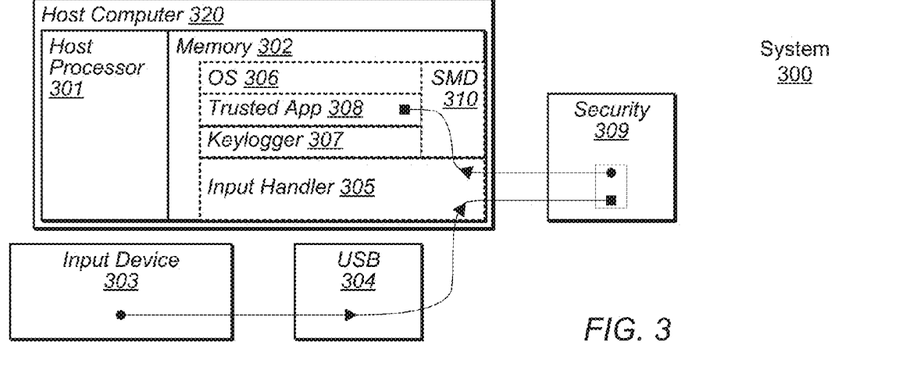
FIG. 3 is a block diagram representing an embodiment of a computing system supporting secure communications with a Universal Serial Bus (USB) input device.

Moving now to FIG. 3, another embodiment of a computing system is illustrated. System 300 includes many components similar to system 200 in FIG. 2, such as host computer 320 including host processor 301 and memory 302, and coupled to input device 303 via USB 304. System 300 may also include security module 309, coupled to host computer 320. Memory 302 may include code from input handler 305, OS 306, and keylogger 307. Memory 302 may also include trusted application 308 and security module driver 310. Host computer 320, host processor 301, memory 302, input device 303, and USB 304, as well as the code instructions corresponding to OS 306 and keylogger 307 may behave as described relative to system 200 in FIG. 2 above.

Security module 309 may support the authentication of user input sent to host processor 301 via input handler 305. Security module 309 may consist of a microcontroller including a processor, memory, interrupts and input/output ports for communication with the other parts of system 300. Various embodiments are contemplated in which security module 309 may be implemented on a same die as host processor 301, a different die in a same package as host processor 301 or in a different package from host processor 301. Security module 309 may include hashing and/or encryption/decryption functions.

In addition to the functions described for input handler 205, input handler 305 may also include functions for hashing and/or encryption/decryption similar to security module 309. In some embodiments, input handler 305 may include two sets of code instructions: a standard input handler that may correspond to the functions described for input handler 205 and a secure input handler that includes the additional features for hashing and/or encryption/decryption. Here within, input handler 305 refers to both sets of code instructions for the combined functions. Input handler 305 may use security module 309 to authenticate data. For example, input handler 305 may share a session key word with security module 309. The session key word may be shared at time when the input handler is first installed in system 300 or in other embodiments may be determined at a system boot time using a key sharing protocol such as a Diffie-Hellman key exchange. At some point after the session key is shared, input handler 305 may receive data from USB 304 and store the received data in an input buffer. Referring to FIG. 2, input handler 205 might, at this point, signal OS 206 that data has been received. In contrast, input handler 305 may now calculate a hash of the data using the session key word and then send the data along with a hash of the data to security module 309. Security module 309 may receive the data and the hash of the data, calculate a hash of the data using the shared session key word and compare the calculated hash value to the hash value received from the input handler.

It is noted that to hash data, or data hashing, as referred to herein refers to a procedure in which a variable amount of data is processed by a function to produce a fixed length result, referred to as a hash value. A hash function should be deterministic, i.e., the same data, presented in the same order should always produce the same hash value. A change in the order of the data or of one or more values of the data should produce a different hash value. A hash function may use a key word, or "hash key," such that the same data hashed with a different key produces a different hash value. Since the hash value may have fewer unique values that the potential combinations of input data, different combinations of data input may result in the same hash value. For example, a 16 bit hash value will have 65536 unique values, whereas four bytes of data may have over four billion unique combinations. Therefore, a hash value length may be chosen that minimizes the potential duplicate results while not being so long as to make the hash function too complicated or time consuming.

Returning to the example, if the two hash values match, then the data may be verified as coming from input device 303 and security module 309 may then forward the data to trusted application 308 in memory 302. Trusted application may be a software application installed by the user that includes a value that has been registered with security module 309 at the time of the software installation. The value used for registration may be a unique value corresponding to a trusted provider of software or may be a code word created by the user to identify trusted software applications in system 300. To share data with the trusted application, security module 309 may store the data in a secure input buffer, the location of which may only be shared with trusted applications. Once the verified data from the input device has been shared with trusted application 308, input handler may return to monitoring USB 304 for the next user input from input device 303 without signaling OS 306 that data has been received. The signaling may not be necessary since the data was passed directly to trusted application 308. Without a signal from input handler 305 to OS 306 to observe, keylogger 307 may not have an indication that data was received from input device 303 and data is therefore transferred to trusted application 308 without the data being logged by keylogger 307.

Memory 302 may also include code instructions for security module driver 310. Security module driver 310 may include the secure input buffer for sharing data with trusted applications as well as other instructions needed for the proper operation of security module 309. Other tasks that may be performed by security module driver include interfacing between host processor 301 and security module 309.

In the previously described example, if keylogger 307 included instructions to monitor the input buffer even without observing a signal from input handler 305 to OS 306, or if keylogger was capable of observing activity resulting from input handler 305, then keylogger 307 may still read data from the input buffer and log the data for transmittal to the identity thief. To avoid such a scenario, input handler 305 may signal security module 309 before input handler 305 receives any data from USB 304 to prepare for a secure data transaction. Security module 309 may indicate to host processor 301, via security module driver 310, that data is about to be transmitted from USB 304 to input handler 305. Host processor 301 may enable a secure mode option on an interrupt line used to monitor USB 304 activity. When USB 304 asserts a signal to host processor 301 to indicate data is ready to be sent, host processor 301 may be switched from a normal operating mode to a secure operating mode in which OS 306 and applications launched from OS 306 cannot execute code. In this secure mode, only some hardware drivers, which may include input handler 305, may be capable of executing instructions. In some embodiments, security module driver 310 may also be capable of running in secure mode. Keylogger 307, which may be launched within OS 306, may not be capable of executing instructions and therefore incapable of reading the input buffer while the secure mode is enabled. Input handler 305 may now receive the data from USB 304, generate the hash value and send both the hash value and data to security module 309 to be verified and stored into the secure input buffer where it may be shared with trusted application 308. Once the data has been stored in the secure input buffer, the host processor may switch back to the normal operating mode where trusted application may now retrieve the data from the secure input buffer.

It is again noted that software programs, applications, and drivers such as input handler 305, OS 306, keylogger 307, trusted application 308, and security module driver 310 may each consist of a collection of code instructions to be executed by host processor 301. As such, when any said block consisting of code instructions is described as performing a task or operation, herein, it is understood that host processor 301 may be performing the said task or operation in response to the execution of the code instructions corresponding to the said block.

The system of FIG. 3 is merely an example of a computing system supporting method for securely receiving data from an input device. Other embodiments may include other functional blocks associated with computing systems, such as, for example, power supplies or removable storage such as a DVD-ROM drive.

Figure 4:
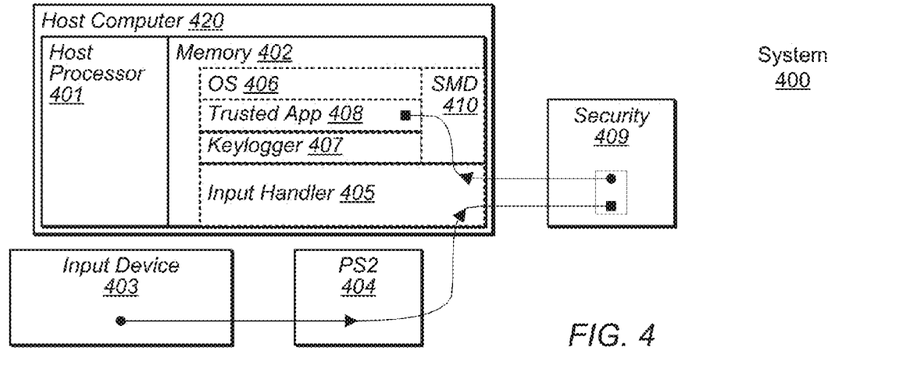
FIG. 4 is a block diagram representing an embodiment of a computing system supporting secure communications with a Personal System/2 (PS/2) input device.

Turning to FIG. 4, another example of a computing system supporting a method for securely receiving data from an input device is shown. System 400 includes many features similar to the features of system 300 in FIG. 3 and, therefore, the descriptions above from FIG. 3 may be applied to the corresponding block in FIG. 4 unless otherwise noted.

PS/2 404 may perform similar tasks as USB 304 from FIG. 3. PS/2 404 however, may provide a different protocol for input devices 403. PS/2 404 may use the Personal System/2 interface (PS/2), which may use a different hardware connector and a different data transmission protocol than the various USB protocols. Input device 403 may, therefore, send data to PS/2 404 using a protocol compatible with the PS/2 standards. Unlike USB 304, PS/2 404 may not be capable of writing data to memory 402, even via a DMA. In such a case, input handler 405 may read data from PS/2 404 and store the data into an input buffer in memory 402. In spite of any hardware or protocol differences, input handler 405 may otherwise behave as described above in relation to input handler 305 and a PS/2 compatible input device may be as secure as an equivalent USB compatible input device.

One difference between USB connectivity and PS/2 connectivity is that the PS/2 connectivity is intended for input devices only, in particular, keyboards and mice or other pointing devices, such as trackballs, for example, while USB connectivity supports an ever-growing range of devices, including the afore mentioned input devices, as well mass storage flash drives, cameras, phones, tablets, toys, etc. PS/2 404 may, therefore, provide a simpler mechanism for implementing the secure input procedure described in relation to FIG. 3 since activity on PS/2 404 may be limited to input device 403. In contrast, activity on USB 304 may not be limited to input device 303 and activity related to non-input devices through USB 304 may need to be managed with awareness to the security requirements of system 300. Additionally, PS/2 404 may be limited to a single device for a given port, i.e., a point-to-point protocol. USB 304, on the other hand, may be expandable to multiple devices of multiple types on a given port.

The system of FIG. 4 is merely an example of a computing system supporting method for securely receiving data from an input device. The system of FIG. 4 is simplified for demonstration purposes. Other embodiments may include other functional blocks associated with computing systems.

Figure 5:
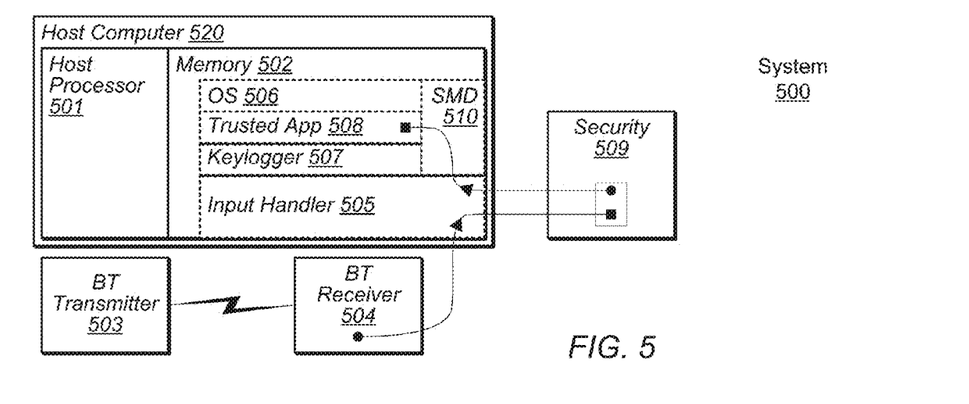
FIG. 5 is a block diagram representing an embodiment of a computing system supporting secure communications with a Bluetooth® input device.

Moving on, another example of a computing system supporting a method for securely receiving data from an input device is shown to FIG. 5. System 500 also includes many features similar to the features of system 300 in FIG. 3 and again the descriptions above from FIG. 3 may be applied to the corresponding block in FIG. 5 unless otherwise noted.

Bluetooth (BT) transmitter 503 may be included as part of a wireless input device, such as, for example, a wireless keyboard and/or mouse. In some embodiments, BT transmitter may also be included in other types of input devices as described in relation to input device 203 in FIG. 2. BT transmitter 503 may be compatible with the Bluetooth wireless standard or the Bluetooth Low Energy (BTLE) standard. In other embodiments, BT transmitter may be compatible with one or more of the Institute of Electrical and Electronics Engineers (IEEE) 802.11 (Wi-Fi) standards or support a proprietary wireless protocol.

BT transmitter 503 may send data to host processor 501 via BT receiver 504. BT receiver 504 may support the same communication standard as BT transmitter 503 and may support additional wireless protocols in addition to the protocol used by BT transmitter 503. BT receiver 504 may perform similar tasks as USB 304 from FIG. 3. In spite of any hardware or protocol differences, input handler 505 may behave as described above in relation to input handler 305 and BT receiver 504 may provide equivalent functions related to securing data from an input device coupled to BT transmitter 503. BT receiver 504 may therefore, assert a signal to host processor 501 which may be coupled to an interrupt signal to indicate data to be transferred from BT receiver 504 to input handler 505. Once data has been received by input handler 505, the procedure for securing and verifying the data may be similar to the procedure described in FIG. 3.

The system shown in FIG. 5 is merely an example of a computing system supporting method for securely receiving data from a wireless input device. The system of FIG. 5 is simplified for demonstration purposes. Other embodiments may include other functional blocks associated with computing systems.

Figure 6:
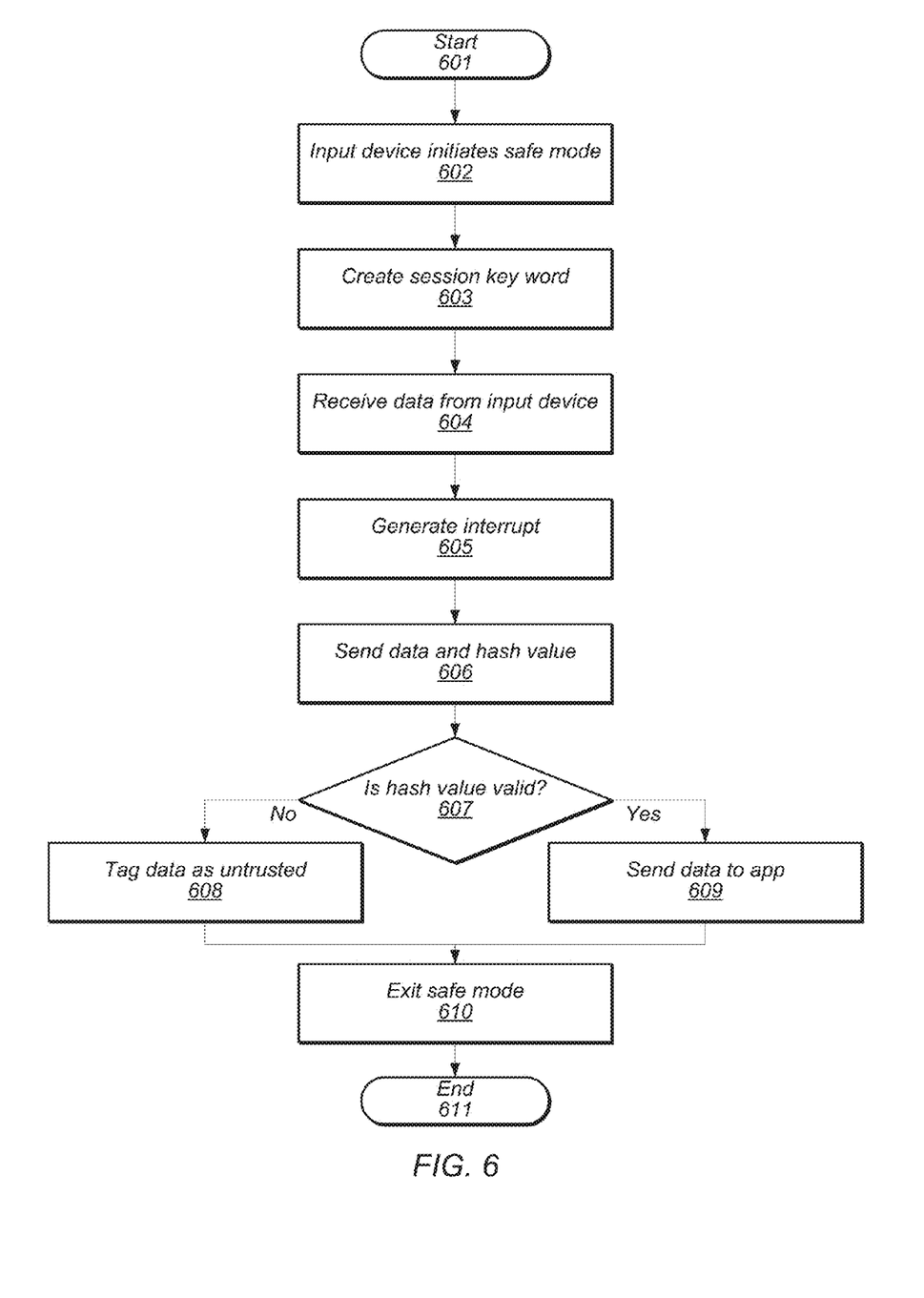
FIG. 6 is a flow diagram illustrating an embodiment of a method for securing data from an input device.

Turning now to FIG. 6, a flowchart for a method for transmitting data from an input device to an application in a computing system is illustrated. The method of FIG. 6 may be applied to a system, such as, for example, system 300 in FIG. 3. Referring collectively to FIG. 3 and FIG. 6, the method may begin in block 601.

An input device, such as input device 303 in FIG. 3, may initiate a safe input mode (block 602). In various other embodiments, an application, such as trusted application 308 may initiate the safe input mode, or an application running within OS 306 such as, for example, a web browser, may receive a request to enter safe input mode from a web page loaded from a remote server. As part of the safe input mode, a security processor, such as security module 309, or an input handler, such as input handler 305, may instruct host processor 301 to couple a secure mode interrupt to a signal from a USB circuit, such as USB 304. In other embodiments, logic circuits other than host processor 301 may couple the signal from USB 304 to the secure mode interrupt. The signal from USB 304 may be asserted whenever data has been received by USB 304 from input device 303.

The safe input mode may be initiated at a time when system 300 is booted or may be enabled and disabled by a user of system 300. If the safe input mode is enabled upon system boot, then all input from input device 303 may sent using secure methods. In some cases, this may lead to a lower performance of the system as extra processing time is spent securing the data and ensuring the data arrives at a trusted destination. By including an option for the user to enable and disable the safe input mode, system performance may be improved when data being entered is not considered sensitive. When sensitive data is required to be entered, such as, e.g., when entering a username and password on a website, the user may initiate the safe input mode. The safe input mode may be initiated through use of a predetermined value sent from the input device. Using a keyboard, for example, the user may type a specific keystroke such as, for example, <Ctrl>+<Alt>+<S>. Alternatively, using a mouse might require the user to click a certain button on the mouse while making a specific gesture, such as a rapid left-right-left motion with the mouse. Using a microphone as an input may require the user to say a specific string of words such as, e.g., "Command, enter, safe, mode," or other combination of words or numbers. The value to be used may be predetermined by software associated with the safe input mode or the value may be programmable by the user.

Once the safe input mode has been initiated, a session key may be generated for use by input handler 305 and security module 309 (block 603). In other embodiments, a session key may be created at the system boot time and reused for all safe input mode sessions until the system is powered down, a user logs off, the system has remained idle for some period of time, or another suitable event occurs. A session key may be based on a value determined at the time code instructions are installed for input handler 305 and security module 309. In other embodiments, a key exchange protocol, such as a Diffie-Hellman key exchange, may be used to generate the session key. In a key exchange protocol, the session key may be shared between input handler 305 and security module 309 by a variety of methods. Input handler 305 and security module 309 may each have a same starting value (also commonly referred to as a "seed value") created at a time when input handler 305 is installed. In other embodiments, either security module 309 or input handler 305 may generate a seed value and send it to the other block. Once input handler 305 and security module 309 share the same seed value, each block may encrypt the seed value using a private key. Input handler 305 and security module 309 may each have their own private key which may not be known by the other block. Input handler 305 and security module 309 may then send their respective encrypted seed value to the other block where each block may then encrypt the received seed value that has been encrypted by the other block. As a result, input handler 305 and security module 309 may now share a common encrypted seed value that has been encrypted by both blocks and may be used as the session key. Various other methods of sharing a session key are known, and may be used in place of the disclosed embodiment.

USB 304 may receive data from input device 303 (block 604). Upon receiving the data, USB 304 may assert the signal to host processor 301 to indicate data is ready to be sent to input handler 305. The asserted signal may be coupled to the interrupt on host processor 301 with the secure mode option enabled.

In response to the assertion of the signal by USB 304, an interrupt may be generated in host processor 301 (block 605). The interrupt may trigger host processor 301 to switch from a normal operating mode to a secure operating mode, such as, for example, an SMM mode on a processor with an x86 architecture or an TrustZone secure mode on a processor with an ARM architecture, or any, other suitable privileged mode available on host processor 301. The switch to the secure operating mode of host processor may prevent instructions associated with the operating system, such as OS 306, from being executed along with instructions for any applications launched within OS 306. Input handler 305 and a software driver for security module 309, such as, e.g., security module driver 310, may be permitted to execute instructions in the secure operating mode. Once the secure operating mode has been entered, data may be transferred from USB 304 to input handler 305.

Input handler 305 may generate a hash of the transferred data, dependent upon the session key from block 603 and send the resulting hash value and the data to security module 309 (block 606). Any suitable hashing algorithm may be used, such as, for example, MD5, SHA-2, or SHA-3. The session key may be used as a key for the hashing algorithm. The data may be sent to security module 309 encrypted or unencrypted. If the data is sent encrypted, the data hash may be optional, as successful decrypting of the data may be adequate proof that the data originated from input device 303. The session key may be used for encrypting and decrypting the data as well as hashing the data.

A determination may then be made dependent on the validity of the data (block 607). Security module 309 may receive the hash value and the data and then generate a second hash value using the received data and the session key from block 603. Security module 309 may then compare the second hash value to the hash value received from input handler 305. If the two values are the same, then the data may be considered verified as originating from input device 303 and therefore valid. If the two hash values are different, then the data may not have originated from input device 303 and may be considered untrusted. In some embodiments, the data may have been received as encrypted data along with the hash value. In such an embodiment, security module 309 may decrypt the data using the session key before generating the second hash value. In other embodiments, only encrypted data may be received without a corresponding hash value. In such a case, the decrypted data may be expected to fall within certain values, and if any decrypted value is outside of the expected values, the data may be deemed untrusted. In further embodiments, decrypted data may include a parity bit or one or more error correction code (ECC) bits which may be used to determine if the decryption of the data was successful, in which case, the data may be considered valid. If the data is determined to be valid, then the method may move to block 609 to be forwarded. Otherwise, the method may move to block 608 where the data may be tagged.

The data may be tagged as untrusted if the hash values mismatched or the decryption of the data failed (block 608). In some embodiments, the untrusted data may be stored and used by an antivirus application to attempt to determine the source of the untrusted data. This may help to determine if malware, such as, e.g., keylogger 307, has been installed in system 300. The untrusted data may be stored in a "quarantine" location which limits code execution in case the untrusted data includes code instructions which may have malicious purposes if unintentionally executed. Instead of, or in addition to, using quarantined memory for storage, the untrusted data may be encrypted before storage. Host processor 301 may not be capable of executing encrypted instructions, making encryption of the untrusted data similarly safe from unintended execution. Security module 309 may signal an antivirus program or may signal the user, by way of OS 306, that untrusted data has been received.

In other embodiments, security module 309 may not store the untrusted data. Instead, security module 309 may delete the untrusted data to help prevent code instructions with potentially malicious intent from executing. Once data has either been stored or deleted, security module 309 may signal host processor 301 to exit the secure operating mode. In various embodiments, the signal to host processor 301 may come from security module driver 310 or from input handler 305. The method may move to block 610 to exit the safe input mode.

If the data was considered valid in block 607, then the valid data may be sent to a trusted application, such as trusted application 308 (block 609). To transfer the valid data to trusted application 308, the data may be stored in a secure input buffer to which only trusted applications have access. In other embodiments, the valid data may be encrypted using a predetermined key word (different from the session key) and stored in a standard input buffer to which any application may have access. In such cases, only trusted applications may have the predetermined key word for decrypting the data. A trusted application may refer to an application which has been registered with security module 309 and/or security module driver 310. The registration process may include sharing the location of the secure input buffer with the application or sharing the predetermined key word with the application. Once data has been stored for trusted application 308, security module 309 may signal host processor 301 to exit the secure operating mode. In various embodiments, the signal to host processor 301 may come from security module driver 310 or from input handler 305.

After data has either been tagged as untrusted or sent to the trusted application, the safe input mode may be exited (block 610). Safe input mode may end due to completion of the processing of the interrupt generated in block 605, such as may be designated by a return from interrupt or similar instruction that may cause host processor 301 to complete interrupt processing. Host processor 301 may return to the normal operating mode at this point. In some embodiments, the signal from USB 304 may also be decoupled from the secure mode interrupt. Other embodiments are contemplated in which safe input mode may end due to the user entering the same value used to enter the safe input mode or due to a request from trusted application 308. In such an embodiment, either input handler 305 or security module 309 may instruct host processor 301 to exit the secure operating mode and/or disable the secure mode option for the interrupt coupled to USB 304. Once safe input has ended and host processor 301 switches to the normal operating mode, the method may end in block 611.

It is noted that security module 309 has been presented in embodiments herein as a hardware module. In some embodiments security module 309, however, may be implemented as a software module. In such embodiments, security module 309 may operate in a secure mode only, such as SMM or TrustZone modes. In other embodiments, security module 309 may operate in a mode which may be a sub-mode of a secure mode which may have stricter access limitations than a baseline secure mode. For example, modes such as SMM and TrustZone may correspond to a baseline mode and a higher level of secure mode may be entered through these modes to enable operation of security module 309. If security module 309 is implemented as a software module, then, in some embodiments, security module driver 310 may be a part of the same software rather than a separate entity.

Again, it is noted that software programs, applications, and drivers such as input handler 305, OS 306, keylogger 307, trusted application 308, and security module driver 310 may consist of series of code instructions to be executed by host processor 301. As such, when any said block consisting of code instructions is described as performing a task or operation, herein, it is understood that host processor 301 is performing the said task or operation in response to the execution of the code instructions corresponding to the said block.

It is also noted that the method depicted in the flowchart of FIG. 6 is merely an example. In other embodiments, a different number of operations may be used, and one or more operations may be performed in parallel or in an alternate order.

Figure 7:
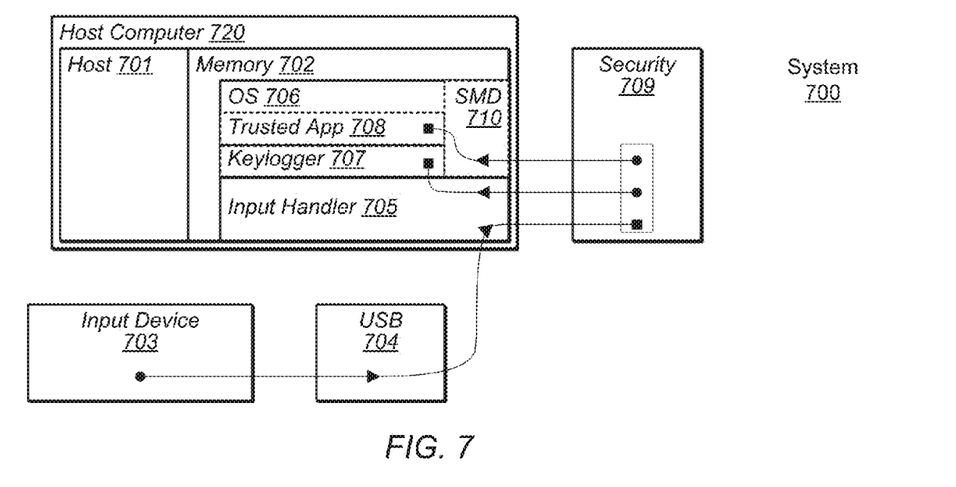
FIG. 7 is a block diagram illustrating an embodiment of a computing system supporting secure communications with an input device.

Moving to FIG. 7, another example of a computing system supporting a method for securely receiving data from an input device is shown. System 700 includes many features similar to the features of system 300 in FIG. 3 and, therefore, the descriptions above from FIG. 3 may be applied to the corresponding block in FIG. 7 unless otherwise noted.

In the embodiment of FIG. 7, after a secure interrupt has been generated and host computer 720 has switched to a secure operating mode in accordance with the method of FIG. 6, input handler 705 may receive data from USB 704 and store the data in an input buffer before sending the data on to security module 709, similar to what was described in regards to FIG. 3. Input handler 705 may generate a hash of the received data and send a copy of the data to security module 709. Security module 709 may confirm the data originated from input device 703 as described in the method of FIG. 6 thereby determining the data is valid. Security module 709 may send the valid data to trusted application 708 using a secure input buffer in which only registered applications such trusted application 708 may access.

Security module 709 may also send data back to input handler 705 to replace the valid data in the input buffer, the data being the same size as the valid data, consisting, however, of a repetition of a predetermined value, which may correspond to a particular ASCII character. For example, if the valid data consisted of strings of ASCII characters such as "password123" representing an entered password, security module 309 may send back a string of ASCII characters such as, for example, "###########" wherein each character of the password is replaced with the "#" character. This process of replacing the valid data with a predetermined value may be referred to as "redacting" the data. Once the valid data is stored in the secure input buffer and the redacted data is stored in the input buffer, security module 309 may signal host processor 701 to switch back to a normal operating mode. If keylogger 707 attempts to read the input buffer, only the redacted data may be read, e.g., "###########."

It is noted that input handler 705, OS 706, keylogger 707, trusted application 708, and security module driver 710 may consist of series of code instructions to be executed by host processor 701. Any said block consisting of code instructions described as performing a task or operation herein, should be interpreted as host processor 301 performing the said task or operation in response to the execution of the code instructions corresponding to the said block.

The system of FIG. 7 is merely an example of a computing system supporting method for securely receiving data from an input device. The system of FIG. 7 is simplified for demonstration purposes. Other embodiments may include other functional blocks associated with computing systems.

Figure 8:
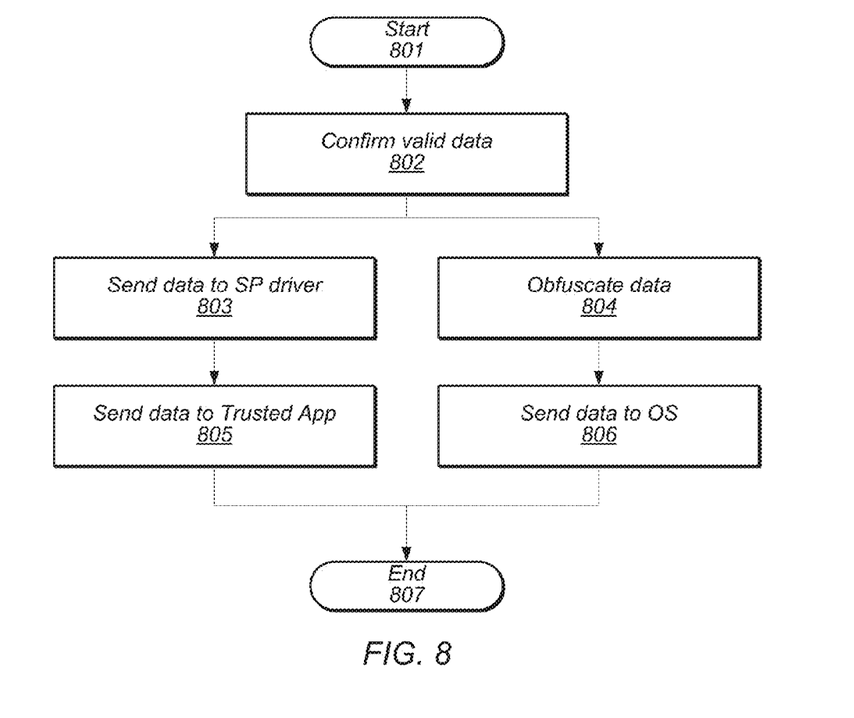
FIG. 8 is a flow diagram illustrating another embodiment of a method for securing data from an input device.

Turning now to FIG. 8, a flowchart is illustrated depicting an embodiment of a method for redacting data in a computing system. The method of FIG. 8 may be applied to a system, such as, for example, system 700 in FIG. 7. Referring collectively to FIG. 7 and FIG. 8, the method may begin in block 801.

A security module, such as security module 709, may confirm that received data is valid (block 802). While a processor, such as host processor 701, is in a secure operating mode, an input handler such as input handler 705 may receive data and store the data in an input buffer. Security module 709 may receive the data from input handler 705. Security module 709 may confirm the data is valid using any of the methods previously disclosed, such as comparing a received hash value with a hash value generated by security module 709.

Security module 709 may send the valid data to a security module driver such as security module driver 710 (block 803). Security module 709 may store the valid data in a secure input buffer to be read by security module driver 710. In some embodiments, the stored valid data may be encrypted using a key word known by security module 709 and security module driver 710. In other embodiments, the valid data may not be encrypted.

Security module 709 may also create redacted data of a similar size to the valid data (block 804). The redacted data may include an equal number of data values as included in the valid data. The values of the valid data, however, may be replaced with a predetermined value. For example, the valid data may correspond to a password such as "mypassword" and the redacted data may be "**********" or a repetition of any other suitable character. In other embodiments, input handler 705 may redact the valid data directly rather than receive redacted data from security module 709. The redacted data may replace the valid data in the input buffer. After both the valid data and the redacted data have been stored, host processor 701 may switch to a normal operating mode.

Security module driver 710 may send the valid data to a trusted application, such as trusted application 708 (block 805). Once host processor 701 has returned to the normal operating mode, security module driver 710 may signal trusted application 708 that data is ready to be read. Trusted application may read the valid data from the secure input buffer, and, if it is encrypted, decrypt the data. Otherwise, trusted application 708 may use the valid data as needed. The method may end in block 807.

Input handler 705 may signal an operating system, such as OS 706, that data has been received and is ready to be read (block 806). OS 706 may alert applications that are waiting on input from input handler 705 that data is ready to be read from the input buffer. Although trusted application 708 may have instigated the need for data to be sent to input handler 705, other applications may be monitoring input handler 705 and/or OS 706 to know when data is in the input buffer. For example, malware, such as keylogger 707 may be waiting for the signal that data is in the input buffer or may periodically read the buffer to log the buffer's contents. Since only the redacted data may be in the buffer, only meaningless data may be collected. The method may end in block 807.

It is noted that the data redaction method depicted in the flowchart illustrated in FIG. 8 is merely an example, and that some of the operations are depicted as being performed sequentially, while others are performed parallel. In other embodiments, different orders of operations and different numbers of operation are possible and contemplated.

Figure 9:
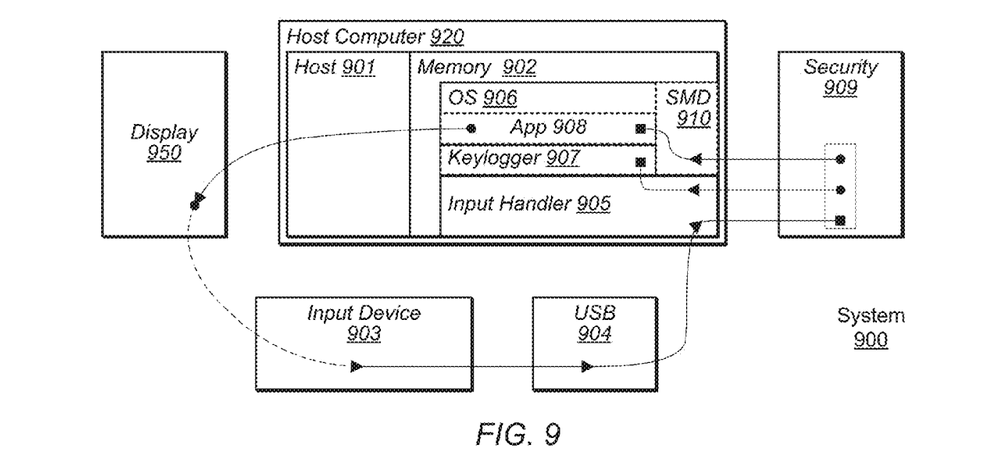
FIG. 9 is a block diagram illustrating an embodiment of a computing system supporting secure authorizations.

Moving now to FIG. 9, another example of a computing system supporting a method for receiving an electronic signature from an input device is shown. System 900 includes many features similar to the features of system 300 in FIG. 3 and, therefore, the descriptions above from FIG. 3 may be applied to the corresponding block in FIG. 9 unless otherwise noted.

Computing systems and methods for securely inputting data through an input device have been disclosed thus far. A similar computing system may be utilized for creating an electronic signature. An electronic signature may refer to a process in which a user of a computer system, such as system 900, enters a value through input device 903 to authorize an action. In this case, the data being entered on input device 903 may not be as important. Instead, ensuring that the user is responsible for entering the data may be more important. For example, a user may select a file to download from a website. The providers of the website may wish to confirm that an actual user is requesting the file and that the request did not originate from malware running unbeknownst to the user. The website may require an electronic signature to be entered before downloading the file.

Trusted application 908, for example, a web browser running on host computer 920, may be requested by the website to request an electronic signature from the user. Through display 950, trusted application may inform the user that an electronic signature is required. Input device 903 may be used to enter the electronic signature. The data for the signature may be a random word shown on display 950 that the user is requested to repeat. Using a process that will be detailed below, security module 909 may validate the data and provide the validated data to trusted application 908. Trusted application 908 may then respond to the website to confirm that a valid electronic signature has been entered. The website may then begin to download the file.

It is noted that input handler 905, OS 906, keylogger 907, trusted application 908, and security module driver 910, may consist of series of code instructions to be executed by host processor 901. Any said block consisting of code instructions described as performing a task or operation herein, should be interpreted as host processor 901 performing the said task or operation in response to the execution of the code instructions corresponding to the said block.

The system of FIG. 9 is merely an example of a computing system supporting a method for receiving an electronic signature from an input device. In other embodiments, one or more additional functional blocks may be included in the computing system.

Figure 10:
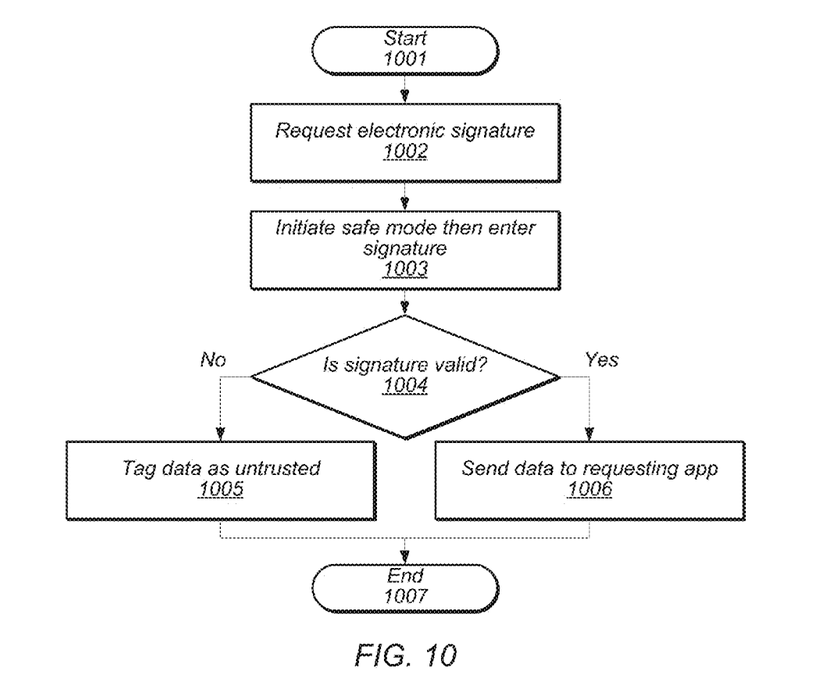
FIG. 10 is a flow diagram illustrating an embodiment of a method for generating an authorization using an input device.

Turning to FIG. 10, a flowchart for a method for generating an electronic signature in a computing system is illustrated. The method may be applied to system 900 of FIG. 9. Referring collectively to FIG. 9 and FIG. 10, the method may begin in block 1001.

A trusted application, such as, e.g., trusted application 908, may request an electronic signature from a user of system 900 (block 1002). In other embodiments, another application, such as a web browser, may receive the request for an electronic signature from a remote server via a web page loaded from the remote server. Trusted application 908 may alert the user to the need for an electronic signature through display 950. The alert may include a value that the user needs to repeat or may request a specific value know to the user, such as, a password, for example.

Before entering the requested value, the user may activate a safe input mode by entering a predetermined value on input device 903 (block 1003). In other embodiments, trusted application 908 may send a request to host computer 920 to enter the safe input mode. The user may then enter the requested value on input device 903 which may then be sent to host processor 901 through USB 904. USB 904 may signal host processor 901 that a value is ready to be sent to host processor 901. Responsive to the signal from USB 904, host processor 901 may enter a secure operating mode due to the safe input mode having been enabled. The secure operating mode may limit host processor 901 from executing any instruction associated with OS 906, as well as applications launched through OS 906, such as, for example, trusted application 908, and keylogger 907. Instructions related to device drivers, such as, input handler 905 and security module driver 910, may still be executed. Therefore, input handler 905 may receive the requested value from USB 904, save the value in an input buffer and then generate a hash value dependent on the requested data and on a session key word. The requested data and the hash value may be sent to security module 909. In some embodiments, the data may be encrypted.

The method may then depend on the validity of the requested data (block 1004). Security module 909 may receive the requested data and the hash value from input handler 905. Security module 909 may generate a second hash value using the same session key word used by input handler 905. If the data is encrypted, security module 909 may decrypt the data before generating the second hash value. If the two hash values match, then the electronic signature may be considered valid and the method may continue in block 1006. Otherwise, if the two hash values don't match, then the signature may be considered invalid.

The signature may be tagged as untrusted if it is invalid (block 1005). Tagging the signature may include replacing the data in the input buffer with another value. A replacement value may also be stored in a secure input buffer. The values in the input buffer and in the secure input buffer may or may not be the same. Once the new values have been stored, host processor 901 may be signaled to exit the secure operating mode. The safe input mode may also be exited. Security module driver 910 may signal trusted application 908 that data is ready to be read from the secure input buffer. Trusted application 908 may read the value from the secure input buffer and compare to the expected value and detect a mismatch. In other embodiments, trusted application 908 may forward the data to another application which may in turn detect a mismatch. The method may end in block 1007.

The requested data may be sent to trusted application 908 if the data was, in block 1004, considered valid (block 1006). The requested data may be stored in the secure input buffer. In various embodiments, the data in the secure input buffer may be encrypted and the data in the input buffer may or may not be redacted. Once the requested data has been stored, host processor 901 may be signaled to exit the secure operating mode. The safe input mode may also be exited. Security module driver 910 may signal trusted application 908 that data is ready to be read from the secure input buffer. Trusted application 908 may read the value from the secure input buffer and compare to the expected value and detect a match, indicating a successful electronic signature. In other embodiments, trusted application 908 may forward the data to another application which may in turn detect a successful electronic signature. The method may end in block 1007.

The method depicted in FIG. 10 is merely an example intended to demonstrate a process validating an electronic signature. In other embodiments, different operations and different orders of operations may be employed.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving, by a host processor operating in a normal operating mode, a request to enter a safe input mode;
   activating, by the host processor, the safe input mode responsive to the request;
   switching the host processor to a privileged operating mode in response to data being available from an input device while the safe input mode is active;
   receiving, by an input handler running on the host processor, the data from the input device, during the privileged operating mode of the host processor;
   generating, by the input handler, a code word corresponding to the received data;
   sending, by the input handler, the received data and the code word to a security processor; and
   verifying, by the security processor, that the received data corresponds to the code word.

2. The method of claim 1, wherein activating the safe input mode responsive to the request comprises receiving a predetermined value through the input device by a user.

3. The method of claim 1, wherein activating the safe input mode responsive to the request comprises receiving a predetermined value received from a remote server.

4. The method of claim 1, wherein switching to the privileged operating mode comprises switching to the privileged operating mode in response to an assertion of an interrupt, wherein the assertion of the interrupt is in response to the data being available from the input device.

5. The method of claim 1, wherein sending the received data and the code word to the security processor comprises encrypting, by the input handler, the received data from the input device prior to sending the received data and the code word to the security processor.

6. The method of claim 1, wherein the security processor includes a microcontroller.

7. The method of claim 1, further comprising:
   storing, by the security processor, the verified data in one or more other memory locations, in response to determining that the received data corresponds to the code word; and
   replacing, by the input handler, the received data with a predetermined value in response to the security processor storing the verified data in the one or more other memory locations;
   switching the host processor to the normal operating mode in response to the security processor storing the verified data.

8. A system, comprising:
an interface configured to receive data from an input device and to assert a signal when data has been received from the input device;
a security processor; and
a host processor coupled to the interface and to the security processor, wherein the host processor is configured to:
during a normal operating mode, receive first data from the interface responsive to an assertion of a first signal from the interface; and
store the received first data in one or more memory locations;
activate a safe input mode responsive to a request;
during the safe input mode, enter a privileged operating mode from the normal operating mode in response to an assertion of a second signal from the interface;
receive second data from the input device, in response to entering the privileged operating mode;
generate a code word corresponding to the received second data; and
send the received second data and the code word to the security processor;
wherein the security processor is configured to verify that the received second data corresponds to the code word.

9. The system of claim 8, wherein the security processor is further configured to:
create a session key word responsive to the request; and
share the session key word with the host processor.

10. The system of claim 8, wherein to enter the privileged operating mode from the normal operating mode, the host processor is further configured to enter the privileged operating mode in response to an assertion of an interrupt, wherein the assertion of the interrupt is responsive to the second signal from the interface.

11. The system of claim 8, wherein to enter the privileged operating mode, the host processor is further configured to activate dedicated hardware.

12. The system of claim 11, wherein the dedicated hardware is on a separate chip from the host processor.

13. The system of claim 8, wherein the host processor is further configured to:
store the verified data in one or more other memory locations in response to a determination that the security processor verified that the received second data corresponds to the code word; and
replace the received second data with a preselected value; and
return to the normal operating mode in response to storing the verified data.

14. The system of claim 8, wherein to send the received second data and the code word to the security processor, the host processor is further configured to encrypt the received second data using the session key word.

15. A method comprising:
receiving, by a host processor operating in a normal operating mode, a request for an electronic signature;
activating, by the host processor, a safe input mode in response to receiving the request for the electronic signature;
creating, by an input handler running on the host processor, a session key word in response to receiving the request for the electronic signature;
switching the host processor to a privileged operating mode from the normal operating mode in response to the electronic signature being available from an input device;
receiving, by the input handler, the electronic signature from the input device during the privileged operating mode of the host processor;
generating, by the input handler, a code word corresponding to the received electronic signature and the session key word;
sending, by the input handler, the code word to a security processor; and
verifying, by the security processor, that the code word corresponds to the received electronic signature and the session key word.

16. The method of claim 15, wherein the request for the electronic signature is a predetermined value received via the input device.

17. The method of claim 15, further comprising receiving the request for the electronic signature via an application running on the host processor.

18. The method of claim 17, further comprising deactivating, by the host processor, the safe input mode in response to receiving an acknowledgement from the application running on the host processor.

19. The method of claim 15, further comprising replacing, by the input handler, the received electronic signature with a predetermined value in response to the security processor verifying that the code word corresponds to the received electronic signature and the session key word.

20. The method of claim 15, further comprising switching the host processor to the normal operating mode in response to the security processor verifying that the code word corresponds to the received electronic signature and the session key word.

* * * * *